United States Patent [19]

Hashiguchi

[11] Patent Number: 5,593,530
[45] Date of Patent: Jan. 14, 1997

[54] LAMINATED LUMBER AND METHOD OF MANUFACTURING THE SAME

[76] Inventor: Tetsuya Hashiguchi, 614, 5-cho, Showa-cho, Hamadera, Sakai-shi, Osaka 592, Japan

[21] Appl. No.: 291,018

[22] Filed: Aug. 16, 1994

[30] Foreign Application Priority Data

Jul. 14, 1994 [JP] Japan .................................. 6-161856

[51] Int. Cl.$^6$ .................................................... B32B 31/00
[52] U.S. Cl. ........................... 156/260; 156/264; 144/345; 144/346
[58] Field of Search ................................... 156/250, 256, 156/259, 260, 264; 144/344, 345, 346, 350, 352

[56] References Cited

U.S. PATENT DOCUMENTS

| | | | |
|---|---|---|---|
| 3,580,760 | 5/1971 | Koch | 156/264 |
| 5,002,105 | 3/1991 | Bodig | 144/346 |
| 5,034,259 | 7/1991 | Barker | 144/350 X |
| 5,135,597 | 8/1992 | Barker | 156/264 |
| 5,147,486 | 9/1992 | Hoffman | 156/154 |
| 5,240,050 | 8/1993 | Shing | 144/350 |

FOREIGN PATENT DOCUMENTS

| | | |
|---|---|---|
| 61-249702 | 11/1986 | Japan . |
| 6-91612 | 4/1994 | Japan . |
| WO89/01857 | 3/1989 | WIPO . |

*Primary Examiner*—James Sells
*Attorney, Agent, or Firm*—Fish & Richardson P.C.

[57] ABSTRACT

Laminated lumber made of a plurality of prismatic wood arranged in the transverse direction and bonded together by an adhesive, in which inside knots are present in the transverse of at least a part of inside pieces of the prismatic wood composing the laminated lumber, and knots are not present at least on the surface of the laminated lumber. As a result, it is possible to obtain high-class laminated lumber without knots on three or four sides by using natural wood with knots with a high product yield.

In the method of making the laminated lumber, a plurality of prismatic wood are arranged in the transverse direction, outside pieces of the prismatic wood have no knots, inside pieces of the prismatic wood which have inside knots lengthwise are rotated such that the knots of the inside pieces of the prismatic wood are present in the transverse direction. By arranging the prismatic wood in this way, there is substantially no knots on the four sides of the laminated lumber. An adhesive is applied between the prismatic wood in this condition, and the prismatic wood is bonded together by pressurization, and the surface is smoothed in due course.

8 Claims, 12 Drawing Sheets

LAMINATED LUMBER AND METHOD OF MANUFACTURING THE SAME

FIELD OF THE INVENTION

The present invention relates to laminated lumber made from natural wood and a method of manufacturing the same. More specifically, this invention relates to laminated lumber which has no knots on three or four sides made from natural wood having knots, and further relates to a method of manufacturing the laminated lumber.

BACKGROUND OF THE INVENTION

High-class woods such as Teak, Oak, Hickory, Walnut, Hinoki, Port-orford-cedar, and Sugi as well as middle-class woods have been used as materials to build houses etc. and to manufacture products for the interior, for example, chairs, tables and bookshelves. Especially in Japan, straight grain boards have been preferred to wave grain boards, and trees with knots are disliked. Many trees became useless the moment the trees were cut down. As shown in FIG. 12, in actual lumbering processes, a board 71 was cut out first crossing the central part of a lumber log 70 while a large knot 67, a middle knot 68, and a small knot 69 were avoided. Subsequently, the rest was cut radially and stepwise into boards 72, and a scrap part 73 was discarded. If a bar-shaped knot (conical knot) was found inside a lumbered board, the lumber was either thrown away or could be only used as lower-class (second-class) wood.

On the other hand, the usual method employed in Europe and the U.S. for making lumber boards from a log is to cut out in a tangential direction (parallel) to the annual ring from a cross-sectional viewpoint of the log. This method has a higher product yield in comparison with the Japanese method.

Other methods of manufacturing straight grain lumber are disclosed in Laid-open Japanese patent application No. (Tokkai Sho) 61-249702 and Laid-open Japanese patent application No. (Tokkai Hei) 6-91612 in which only straight grain lumber is chosen and laminated with the use of an adhesive.

However, the above-mentioned conventional method which has been employed in Japan had the problem that the product yield for obtaining lumber without knots was extremely low. Furthermore, there was also a problem that wooden products easily made partial cracks or shakes since they are made of one board.

On the other hand, although people in Europe and the U.S. tend to be not so particular about straight grain lumber in general like Japan, they prefer lumber without knots. As already mentioned, a method employed in Europe and the U.S. is to cut out in a tangential direction (parallel) to the annual ring from the cross-sectional view of the log. Nevertheless, since knot parts were disliked, they were either dumped or used only as second-class wood. As a result, it was also a problem in Europe and the U.S. that product yield for obtaining lumber without knots was low. In addition, there was also a problem that wooden products easily made partial cracks or shakes since they are made of one board.

In the methods disclosed in the above-mentioned Laid-open Japanese patent application No. (Tokkai Sho) 61-249702 and Laid-open Japanese patent application No. (Tokkai Hei) 6-91612, product yield from a log remains similarly low since only parts without knots are used.

SUMMARY OF THE INVENTION

It is an object of this invention to solve the above-noted problems by providing high-class laminated lumber which has no knots on three or four sides by using natural wood with knots, while maintaining a high product yield from a log. A further object is to provide a method of manufacturing the laminated lumber.

In order to accomplish these and other objects and advantages, laminated lumber of this invention comprises a plurality of prismatic wood arranged in the transverse direction and bonded together by an adhesive, in which inside knots are present in the transverse direction of at least a part of inside pieces of prismatic wood composing the laminated lumber, and in substance, knots are not present at least on the surface of the laminated lumber. In this invention, prismatic wood indicates rectangular parallelopiped wood.

It is preferable in this embodiment that knots are not present on three or four sides which face the crossing direction to the longitudinal direction of the lumber.

Furthermore, it is preferable in this embodiment that grains are arranged substantially in the longitudinal direction of said laminated lumber.

Furthermore, it is preferable in this embodiment that the plurality of prismatic wood consists of at least three pieces of wood.

Furthermore, it is preferable in this embodiment that the laminated lumber has a length of 300 mm or more, a width of 30 mm or more, and a thickness of 10 mm or more.

Furthermore, it is preferable in this embodiment that the laminated lumber is at least one wood selected from the group consisting of Teak, Oak, Hinoki, Port-orford-cedar, Sugi, Itayakaede, Harigiri, Mizume, Udaikamba, Asada, Katsura, Sawara, Nezuko, Asunaro, Kuri, Buna, Konara, Tochinoki, Onigurumi, Kusunoki, Enju, Yachidamo(= Iasenj), Shioji, Karamatsu, Akaezomatsu, Himekomatsu, Tsuga, Yamazakura, Shiurizakura, Kihada(=Barkhat), Doronoki(=Topolj), Kouyamaki, Ichii, Aoshina, Nire(=Ilem), Keyaki, Makaba, Sen, Kaya, Hiba, Momi, Nara(=Dub), Matsu, Alder, Ash, Aspen, Basswood, Beech, Yellow birch, Paper birch, Butternut, Cherry, Coffeetree, Cottonwood, Southern cypress, Red elm, Sap and red gum, Hackberry, Hickory, Honeylocust, Koa, Magnolia, Hard maple, Soft maple, Red oak, White oak, Pecan, Persimmon, Southern yellow pine, White pine, Sassafras, Sycamore, American tulipwood, Tupelo and black gum, Black walnut, Black willow, New Guinea walnut, Jelutong, Agathis, Mersawa, Koruing, Kapur, White lauan, Red lauan, Red meranti, White seraya, Yellow meranti, White meranti, Selangan batu, Selangan batu merah, Ramin, Narra, Sepetir, Ebony, Sonokelibg, Rosewood, Teak, Lignum-vitae, Alaska-cedar, Western redcedar, Pacific silver fir, Grand fir, Noble fir, Western latch, Western white pine, Lodgepole pine, Ponderosa pine, Engelmann spruce, Sitka spruce, Douglas fir, Western hemlock, Redwood, Pikhta, Elka, Kedr, Sosna, Bereza, Dub(=Nara), Orekh, Iasenj(=Yachidamo), Bubinga, Sapelli, African mahogany, Moabi, Makore, Radiata pine, Taiwan hinoki, Paulownia, Balsa, Mahogany, China tamo, Alerce, Araucaria, Manio, Cipress, Laurel, and Robie.

A method of manufacturing laminated lumber of this invention comprises the steps of:

(A) cutting out a plurality of boards from a log having annual rings of a natural tree in a direction tangential to the annual rings from the cross-sectional viewpoint;

(B) cutting the boards in the thickness direction into prismatic wood, in which at least one cutting line is cut avoiding knot parts;

(C) arranging the plurality of prismatic wood in the transverse direction, in which inside pieces of prismatic wood composing the laminated lumber are arranged such that inside knots are present in the transverse direction, so that knots are not present at least on the surface of the laminated lumber; and (D) applying an adhesive between the prismatic wood and bonding them together by pressurization, and smoothing the surface.

It is preferable in step (B) of this embodiment that both cutting lines are drawn avoiding knot parts.

Furthermore, it is preferable in step (C) of this embodiment that outside pieces of prismatic wood composing the laminated lumber are selected to have substantially no knots on the surface.

Furthermore, it is preferable in step (A) of this embodiment that first cutting lines are drawn from the outside into a vicinity of the core in the direction perpendicular to a large knot in the log of natural tree, and subsequently, second cutting lines are drawn in the direction perpendicular to the first cutting lines on the outside part of the log, and then, third cutting lines are drawn from the outside into a vicinity of the core in the direction perpendicular to the second cutting lines.

According to the above-mentioned embodiment of this invention, laminated lumber comprises a plurality of prismatic wood arranged in the transverse direction and bonded together by an adhesive, wherein inside knots are present in the transverse direction of at least a part of inside pieces of the prismatic wood comprising the laminated lumber, so that knots are not present at least on the surface of the laminated lumber.

As a result of this method, it is possible to obtain high-class laminated lumber without knots on three or four sides by using natural wood with knots, thereby maintaining a high product yield. In other words, although wood with knots is used, knots do not appear on the surface by following this method. Knots and parts surrounding the knots can also be used for products, and therefore, natural resources are efficiently utilized by creating very little scrap. Moreover, since this is a laminated product, there is little possibility of causing partial checks and shakes, thereby upgrading the value of the product. In addition, knots which exist in the inside also serve to reinforce the strength of the lumber. Therefore, parts of the wood which were of no value in the past, can actually improve the quality of the lumber. Thus, in this invention it is possible partially to use prismatic wood without knots for inside pieces.

According to the above-mentioned embodiment of this invention, it is preferable that knots are not present on three or four sides which face the crossing direction to the longitudinal direction of the lumber. Thus, the lumber can be classified as high-class. Laminated lumber having no knots on three sides can be used for decorative frames in buildings, staircases, window frames, door frames, wall boards, tables, etc, in which three sides without knots are arranged to face the direction to be seen, and the side with knots is arranged to face the part (e.g. back side) which can not be seen.

According to the above-mentioned embodiment of this invention, it is preferable that grains are arranged substantially in the longitudinal direction of the laminated lumber so that grain patterns peculiar to wood appear beautifully. This is due to the fact that glued layers run along the grain patterns and become unnoticeable. Grain patterns can be straight-grained, wave-grained, or grained in other various patterns. When laminated lumber has no knots on four sides and has grains arranged substantially in the longitudinal direction of the lumber, this laminated lumber resembles natural wood without knots on four sides.

According to the above-mentioned embodiment of this invention, it is preferable that the plurality of prismatic wood consists of at least three pieces of wood. By using one piece of prismatic wood with knots for the inside and two pieces without knots for the outside pieces, it is possible to manufacture lumber which has the appearance of having no knots.

According to the above-mentioned embodiment of this invention, it is preferable that the laminated lumber has a length of 300 mm or more, a width of 30 mm or more, and a thickness of 10 mm or more. An even more preferable dimension of the laminated lumber comprises a length of 3000 mm to 12500 mm, a width of 120 mm to 1000 mm, and a thickness of 25 mm to about 1200 mm.

In the above-mentioned embodiment, any kind of wood can be used as the laminated lumber, for example, Teak, Oak, Hinoki, Port-orford-cedar, Hickory, Sugi, Walnut, as mentioned above. Accordingly, high-class wood can be used more effectively. Thus, wood which was expensive in the past can be low-priced.

By using the method of manufacturing laminated lumber of this invention, high-class laminated lumber without knots on three or four sides can be attained from natural wood with knots efficiently and with a high product yield.

In step (B) of the above-mentioned embodiment, it is preferable that both cutting lines are drawn avoiding knot parts, thereby attaining laminated lumber without knots on the surface as well as on the back.

In step (C) of the above-mentioned embodiment, it is preferable that outside pieces of prismatic wood composing the laminated lumber are selected to have substantially no knots on the surface. As a result, edges of the laminated lumber can be finished beautifully.

In step (A) of the above-mentioned embodiment, it is preferable that first cutting lines are drawn from the outside into a vicinity of the core in the direction perpendicular to a large knot inside the log from a natural tree, and subsequently, second cutting lines are drawn in the direction perpendicular to the first cutting lines on the outside part of the log, and then, third cutting lines are drawn from the outside into a vicinity of the core in the direction perpendicular to the second cutting lines. As a result, high-class laminated lumber without knots on three or four sides can be attained from natural wood with knots efficiently and with a high product yield.

DETAILED DESCRIPTION OF THE INVENTION

Figure 1:
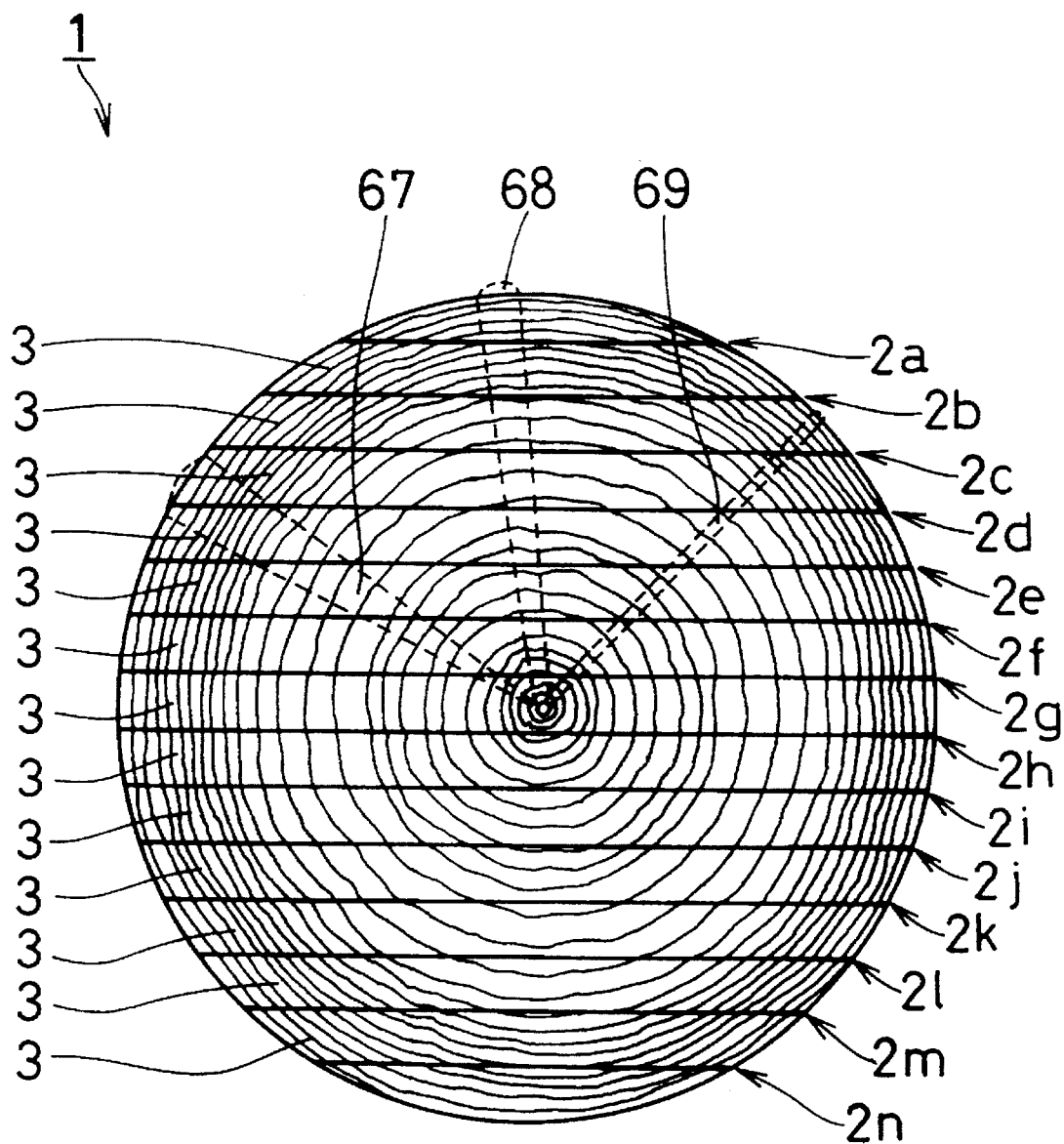
FIG. 1 is a drawing of one embodiment showing a method of cutting a log used in this invention.

One embodiment of this invention is specifically described by referring to the attached figures. FIG. 1 shows a method of cutting a log used in this invention. In the first place, a log 1 of natural tree is prepared and cut transversely and parallel by using an automatic saw. In this instance, a large knot 67, a middle knot 68, and a small knot 69 are not avoided so that they remain inside the board. 2a to 2n show cutting lines. Although the cutting pitch can be set at random, a preferable thickness is 25 mm or more, for example, 30 mm, 70 mm, 100 mm, and 120 mm. The thickness can be freely chosen according to the dimensions of a conical knot. The length is typically 3 m, but it is also possible to select other lengths, e.g., 20 feet (about 609.6 cm) and 41 feet (about 1,249.68 cm) in length. A plurality of boards 3 are cut in this way, and circular arc parts are cleared off from the edges of boards 3.

Figure 2:
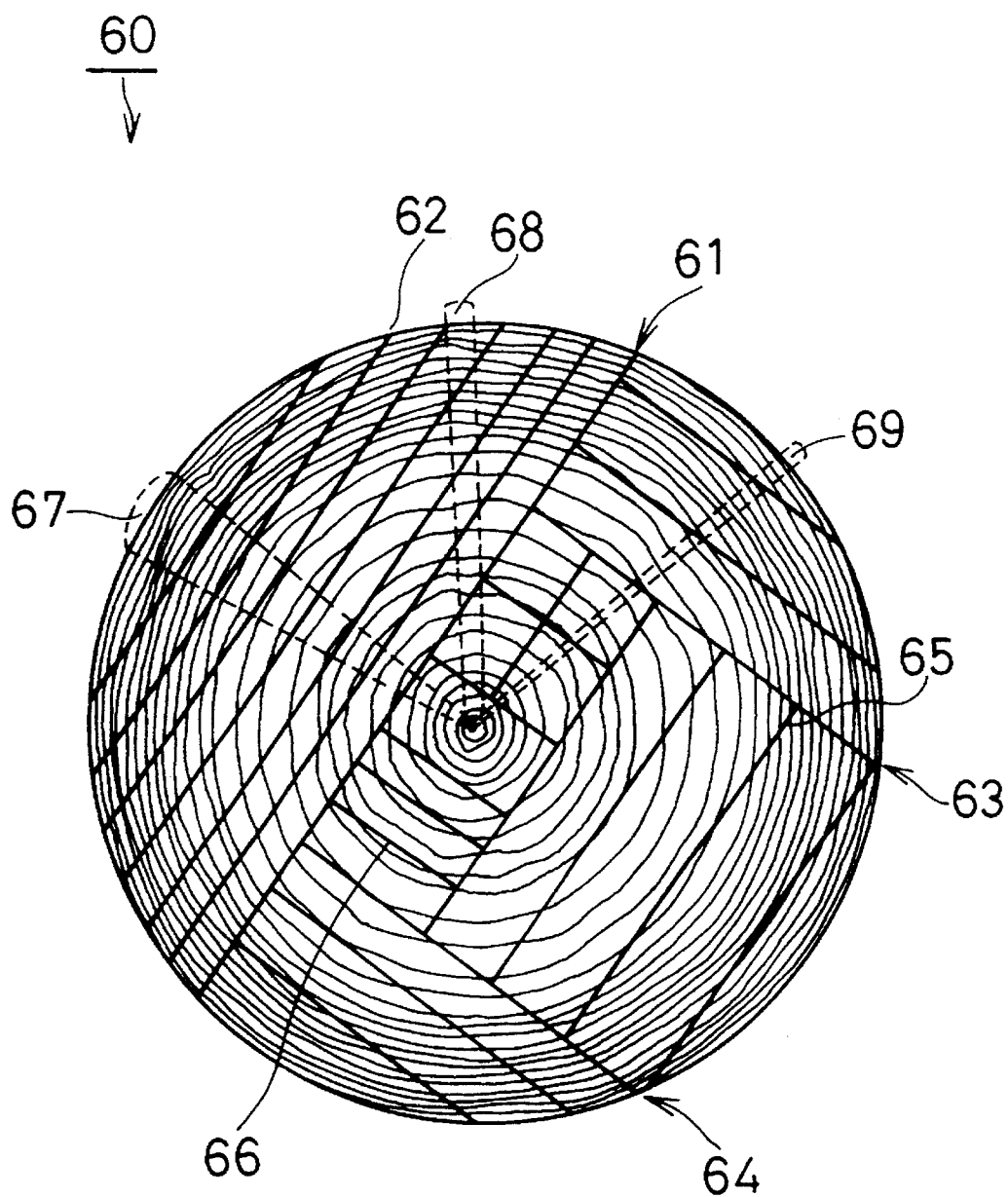
FIG. 2 is a drawing of another embodiment showing a method of cutting a log used in this invention.
Figure 3:
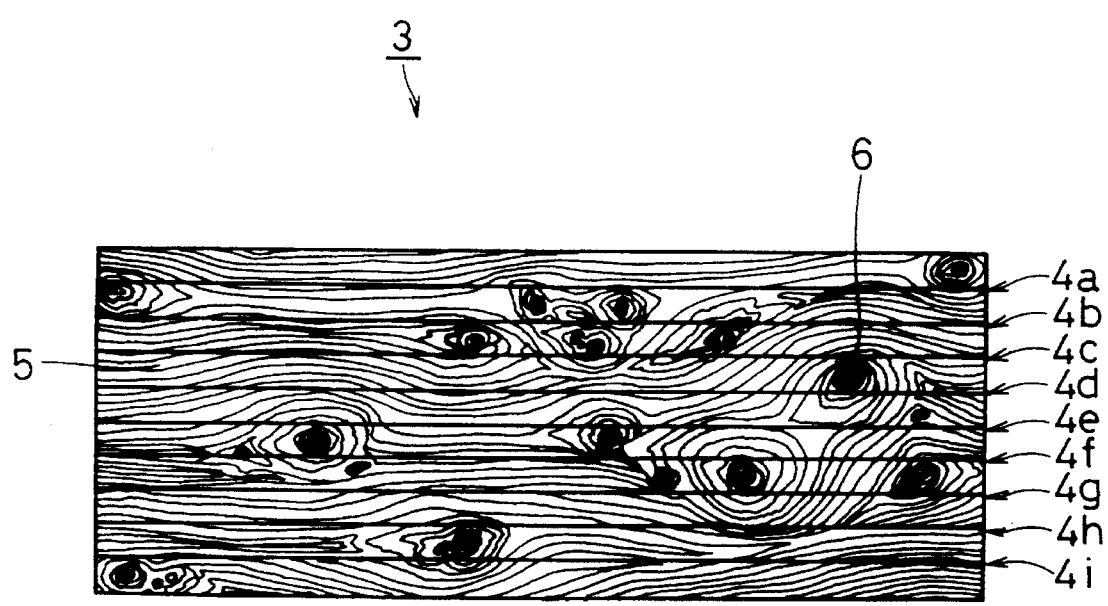
FIG. 3 is a drawing of one embodiment of this invention showing a manufacturing process of laminated lumber without knots on four sides at the stage of forming prismatic wood.

FIG. 2 shows another method of cutting a log used in this invention. In the first place, a log 60 from a natural tree is prepared for cutting. Then, first cutting lines 61, 62 are drawn from the outside into a vicinity of the core in the direction perpendicular to large knot 67 by using an automatic saw. Subsequently, second cutting lines 63, 64 are drawn in the direction perpendicular to the first cutting lines on the outside part. And then, a third cutting line 65 is drawn from the outside into a vicinity of the core in the direction perpendicular to the second cutting lines. Next, a fourth cutting line 66 is drawn parallel to the second cutting lines to cut the core part. In this instance, large knot 67, middle knot 68, and small knot 69 are not avoided so that they remain inside the board.

Next, a manufacturing process of laminated lumber without knots on four sides is shown in FIGS. 3 to 8. First of all, board 3 lumbered in FIG. 1 is prepared and cut in the thickness direction by using an automatic saw into prismatic wood 5. In particular, the board will be cut along cutting lines 4a to 4i. When both cutting lines avoid knot parts 6, it is possible to obtain laminated lumber without knots on four sides. When one cutting line avoids knot parts 6, laminated lumber without knots on three sides can be obtained. In order to cut avoiding knots, the knots on the surface of the board are observed by a solid image pick-up device (CCD), and then, the data are input into a computer which determines each cutting width automatically. By combining pieces of the prismatic wood having the same cutting width, laminated lumber of a uniform thickness can be formed without creating any waste. Furthermore, when wood colors and grain patterns are input during the computer processing, laminated lumber of equal quality can be obtained.

Figure 4:
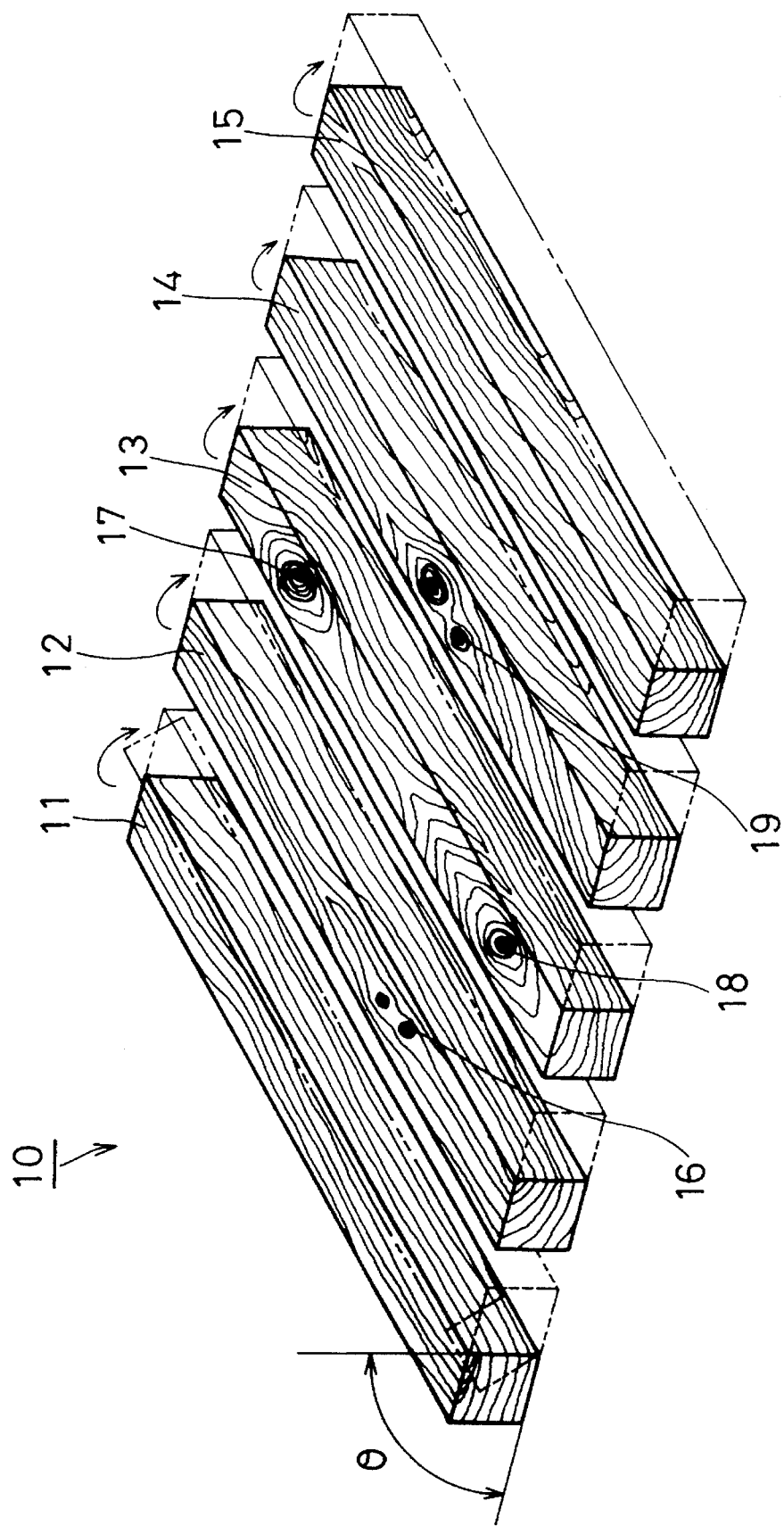
FIG. 4 is a drawing of the prismatic wood before being rotated 90 degrees.
Figure 5:
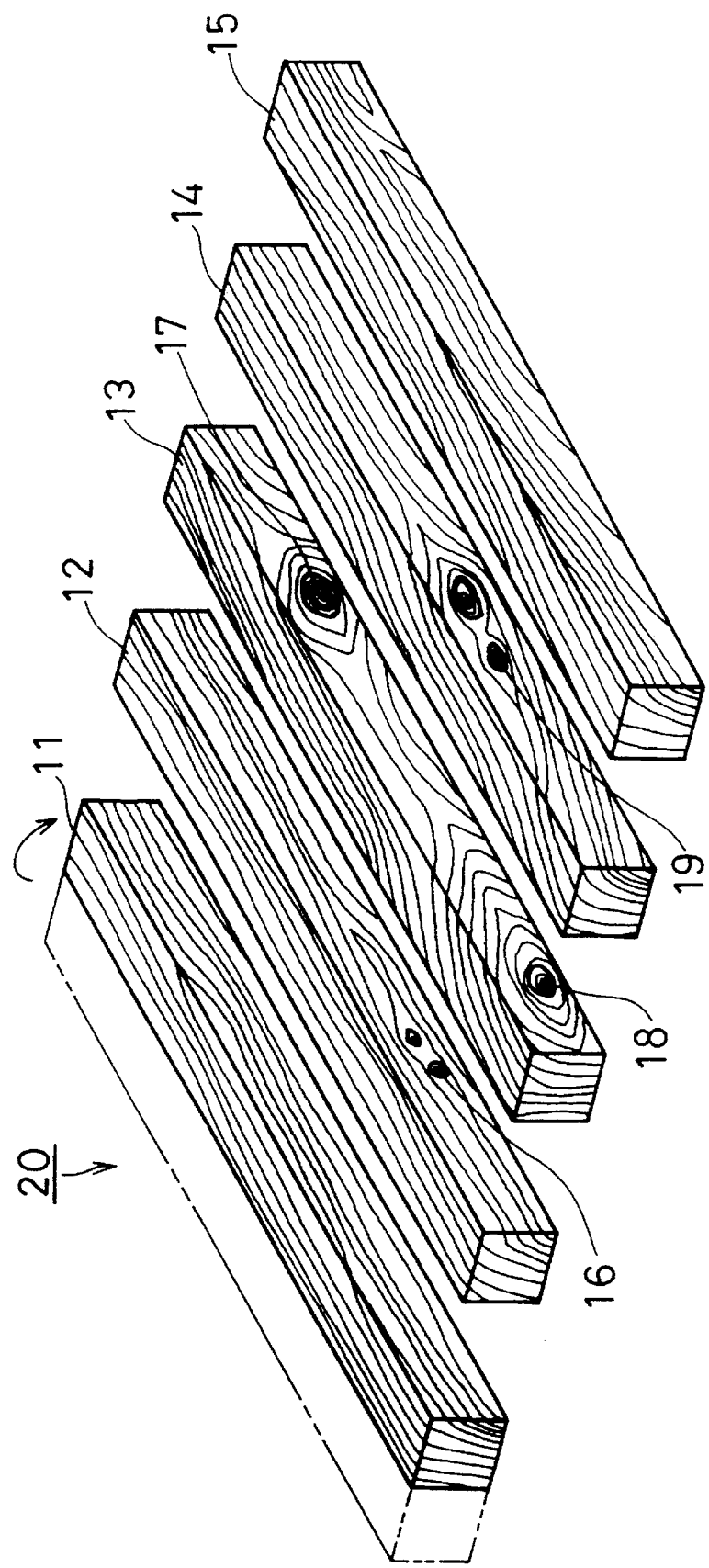
FIG. 5 is a drawing of the prismatic wood after being rotated 90 degrees.
Figure 6:
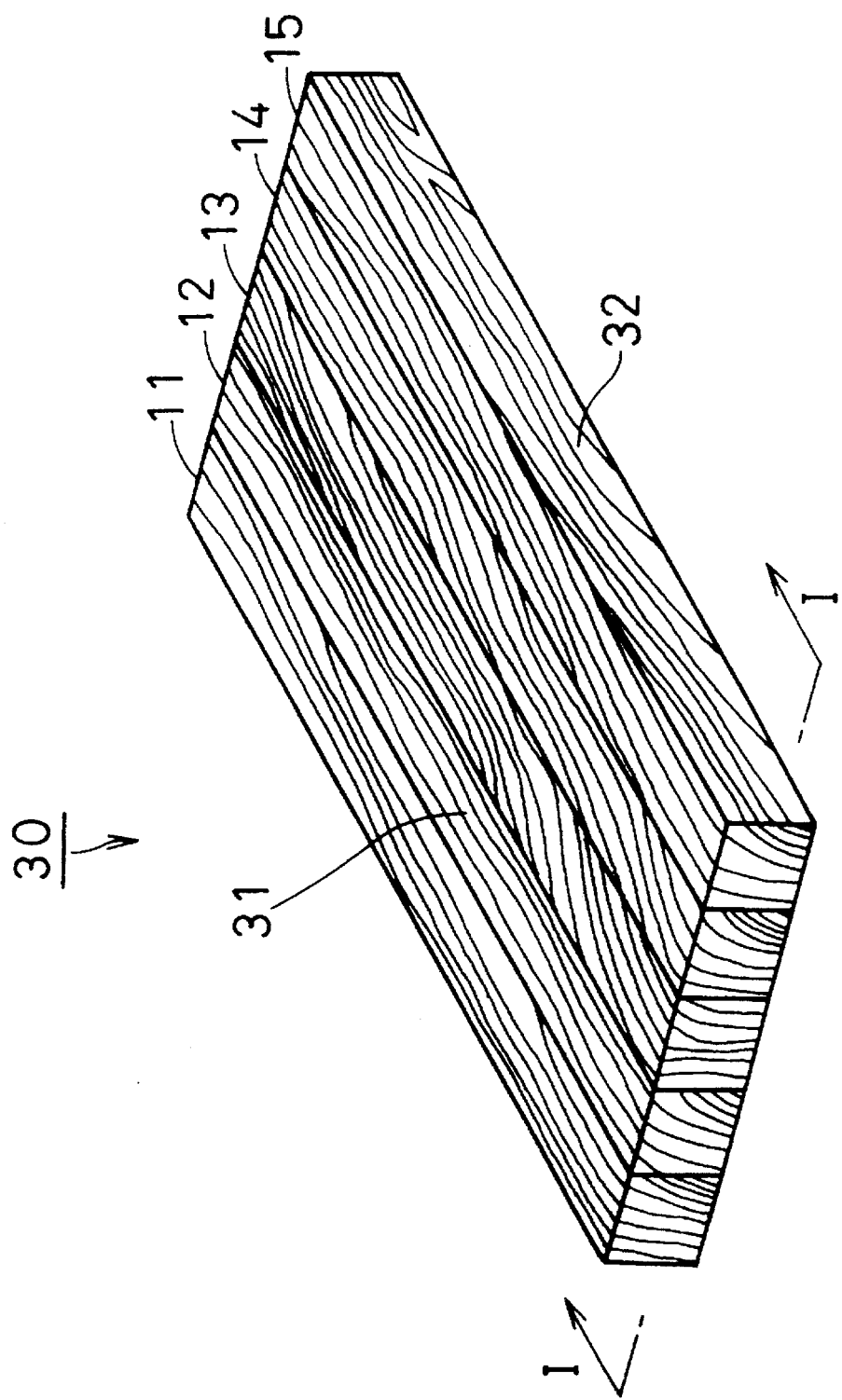
FIG. 6 is a perspective view showing the surface of the laminated lumber without knots on four sides.
Figure 7:
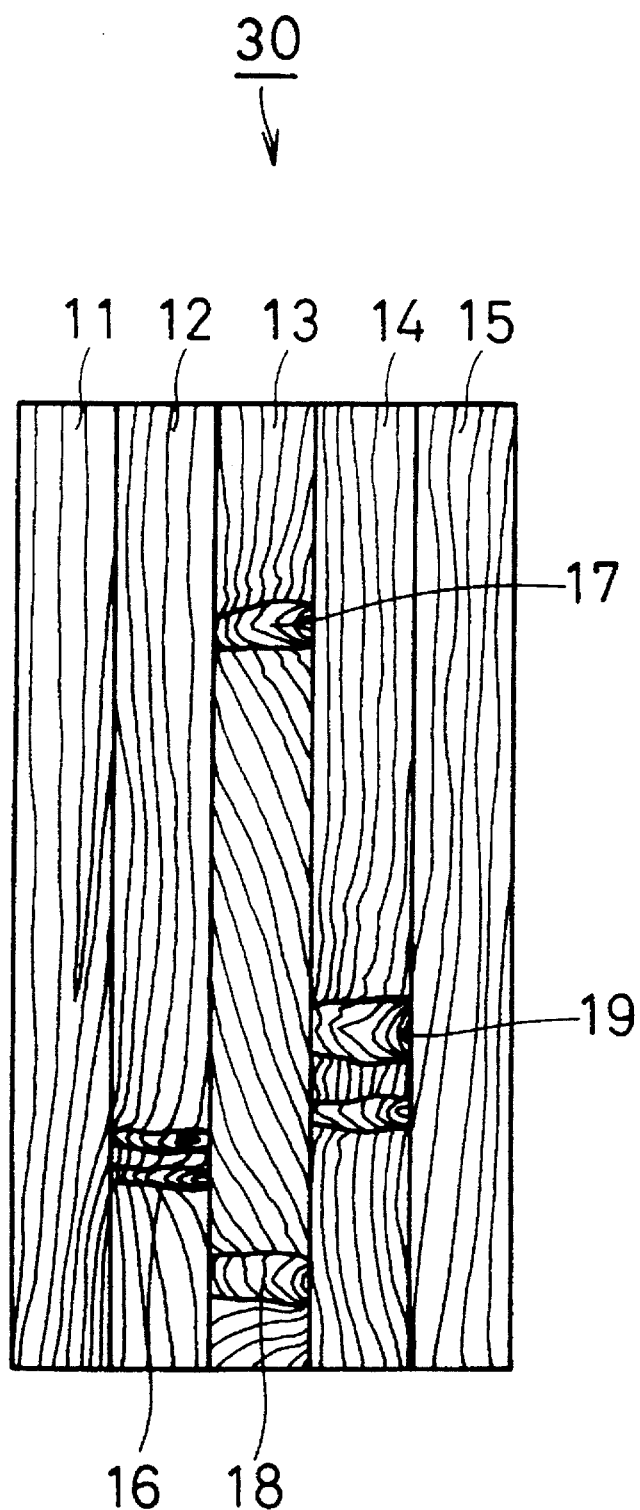
FIG. 7 is a cross-sectional view taken on line I—I of FIG. 6.

Next, a group of wood 10 consisting of a plurality of prismatic wood 11 to 15 are arranged vertically as shown in FIG. 4. Outside pieces of prismatic wood 11 and 15 have no knots. Prismatic wood 12 to 14 which are located in the inside have knots 16 to 19 in the vertical direction. And then, inside pieces of prismatic wood 12 to 14 composing laminated lumber are rotated at an angle of 90 degrees so that inside knots 16 to 19 are present in the transverse direction. FIG. 5 shows the prismatic wood after being rotated 90 degrees. Substantially, the knots are not present on the surface of the group of wood 20 consisting of the plurality of prismatic wood 11 to 15. In this condition, an adhesive is applied between the prismatic wood, and the prismatic wood is bonded together by pressurization. Any kind of adhesive can be used here that is suitable for use as bond for wood. One example of a suitable adhesive is an acrylic adhesive such as polymethyl methacrylate or epoxy resin. The surface is smoothed in due course by a planer. The laminated lumber obtained in this manner is shown in FIG. 6. In FIG. 6, knots are not present on a surface part 31 and a right side part 32. Reference numeral 30 shows laminated lumber. A cross-sectional view taken on line I—I of FIG. 6 is shown in FIG. 7. It is clear that inside knots which are present in the inside pieces of prismatic wood 12 to 14 face the transverse direction.

Figure 8:
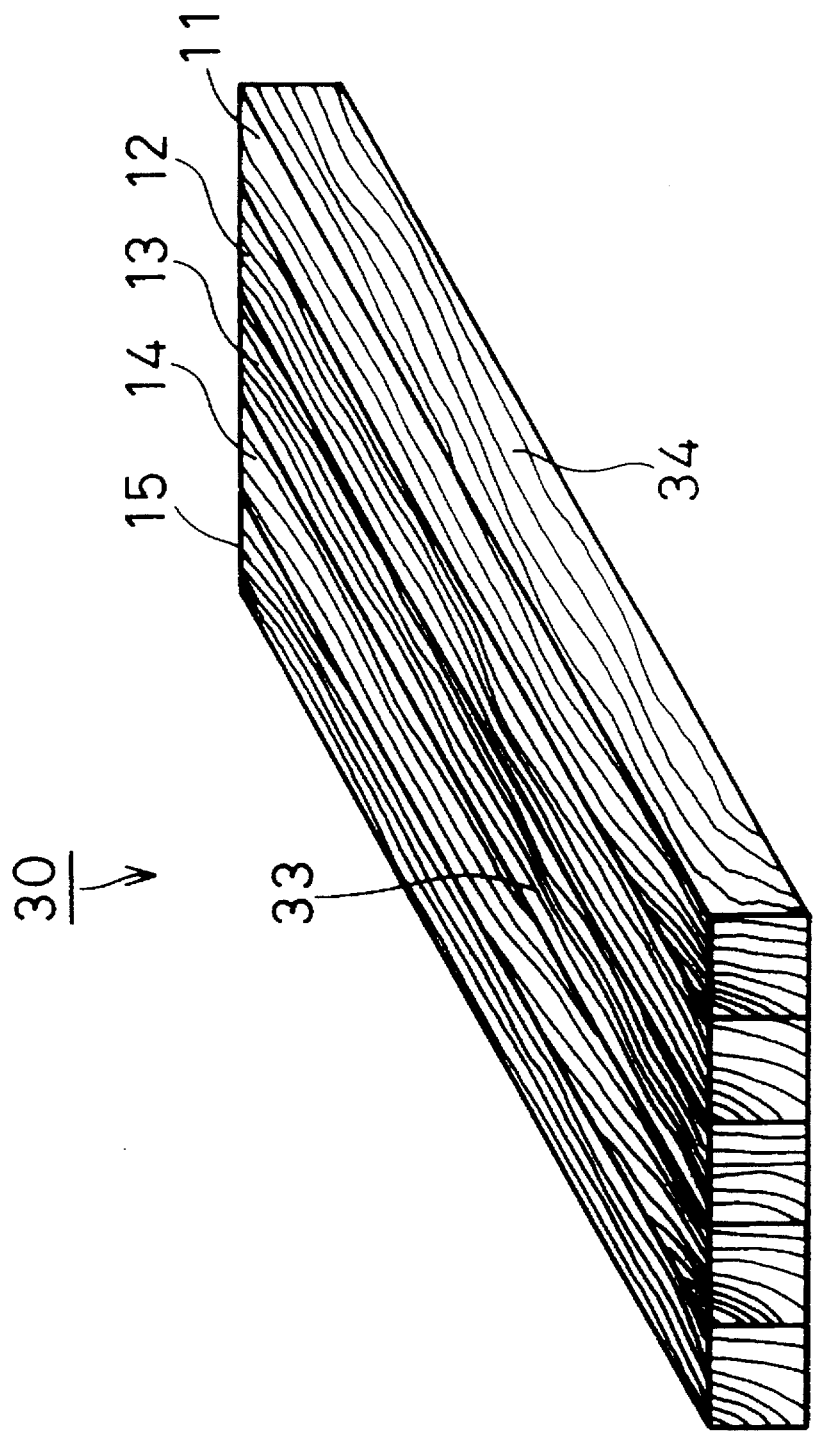
FIG. 8 is a perspective view showing the back of the laminated lumber without knots on four sides.

FIG. 8 shows the back side of laminated lumber 30. In FIG. 8, knots are not present on a back part 33 and a left side part 34. Accordingly, laminated lumber without knots on four sides was obtained from a log with knots. Furthermore, the method shown in FIGS. 3 to 8 is suitable for obtaining relatively thin laminated lumber.

Figure 9:
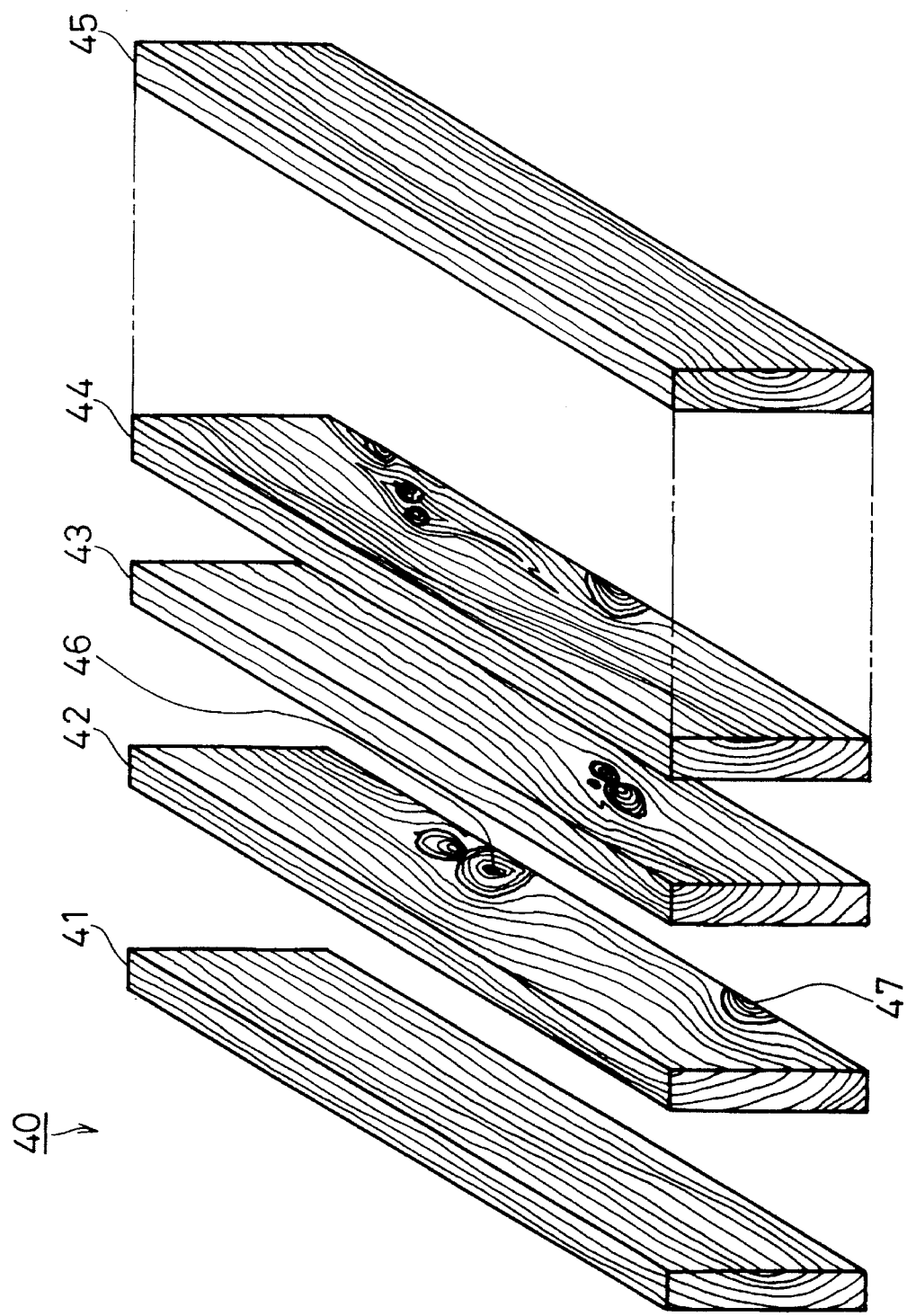
FIG. 9 is a drawing of one embodiment of this invention showing a manufacturing process of laminated lumber without knots on three sides in the arranged state.
Figure 10:
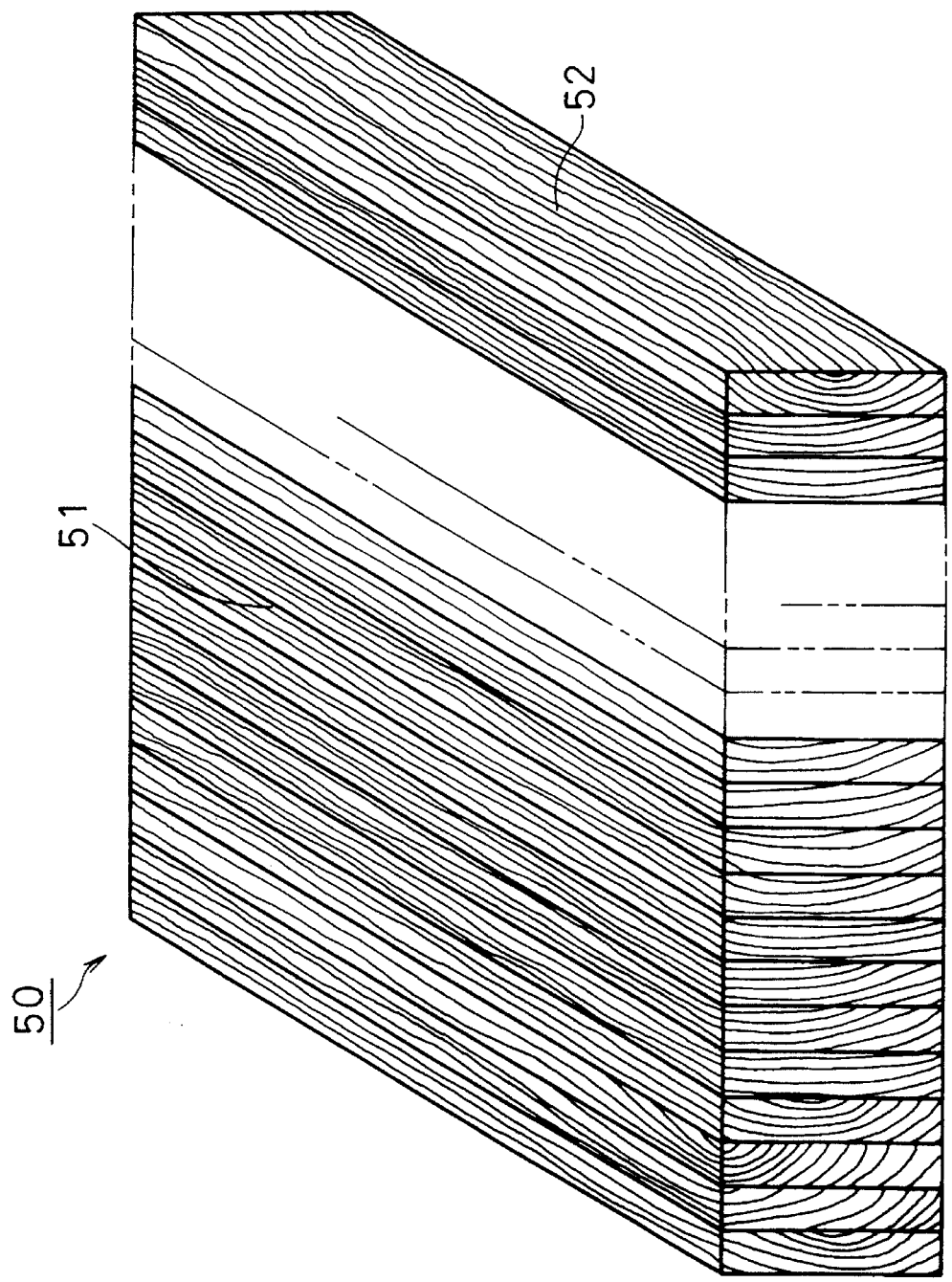
FIG. 10 is a perspective view showing the surface of the laminated lumber without knots on three sides.
Figure 11:
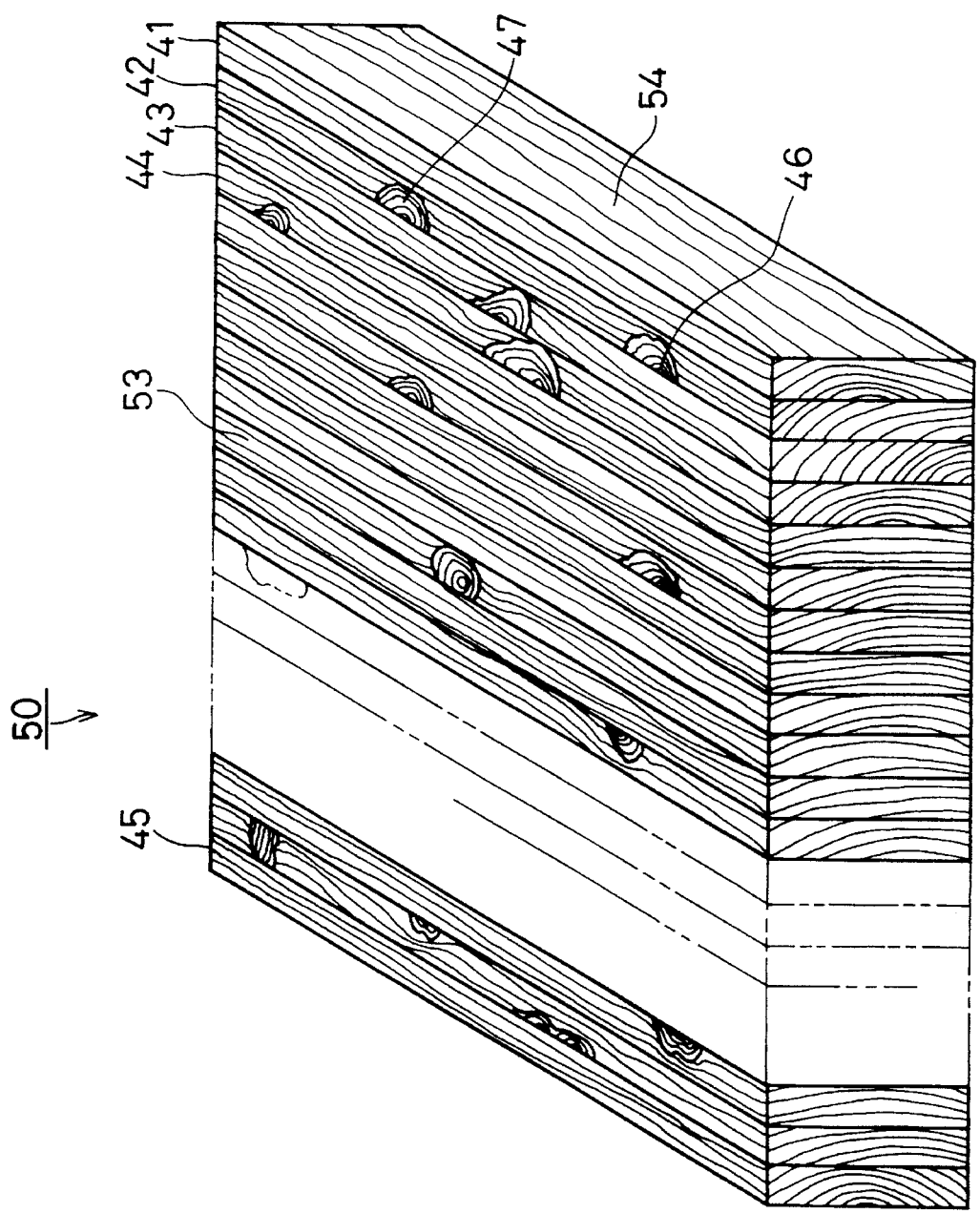
FIG. 11 is a perspective view showing the back of the laminated lumber without knots on three sides.

FIGS. 9 to 11 show a method of manufacturing laminated lumber without knots on three sides. A group of wood 40, for example, pieces of prismatic wood 41 to 45, are arranged, as shown in FIG. 9. In this instance, pieces of prismatic wood 42 to 44 with knots 46, 47 on the back side are arranged between two outside pieces of prismatic wood 41, 45 without knots. In this condition, an adhesive is applied between the prismatic wood, and the wood is bonded together by pressurization. The surface is smoothed in due course. Laminated lumber 50 obtained in this manner is shown in FIG. 10. In FIG. 10, knots are not present on a surface part 51 and a right side part 52. As shown in FIG. 11, there is also no knots on a left side part 54, but knots are present on a back part 53. Back part 53 with knots can be used to face the part which can not be seen. For example, this laminated lumber is suitable as a counter in bars or in restaurants.

In the following discussion, conventiona methods of manufacturing lumber without knots on three or four sides from natural trees will be compared to the method of this invention (A1), the conventional Japanese style (B1), and the conventional European/American style (C1). The trees used in this experiment were Port-orford-cedar which were imported from a forest in Gold Beach, Oregon, USA (United States Forest Service). Raw logs were provided which consisted of 2,200 m$^3$ of logs without knots on all sides which are called plain (11% by weight), 5,600 m$^3$ of logs with knots on one side (28% by weight), and 12,200 m$^3$ of logs with knots on two sides or more (61% by weight). The total amount was 20,000 m$^3$ with 4843 pieces of logs. The amount and the grading proportion were the same in all above-mentioned cases of A1, B1, and C1.

In the method of this invention (A1), there were 17,000 m$^3$ (85% by weight when the weight of the raw logs are set as 100) of lumber (board 3 in FIG. 1) and 14,500 m$^3$ of lumber without knots on three or four sides (73% by weight as mentioned above). In other words, the raw logs could yield products at the rate of 73% by weight. Finally, products without knots on three or four sides became decorative laminated boards for buildings with a dimension of mainly 3 m in length, 12 cm or more in width, and 2.5 cm or more in thickness.

Figure 12:
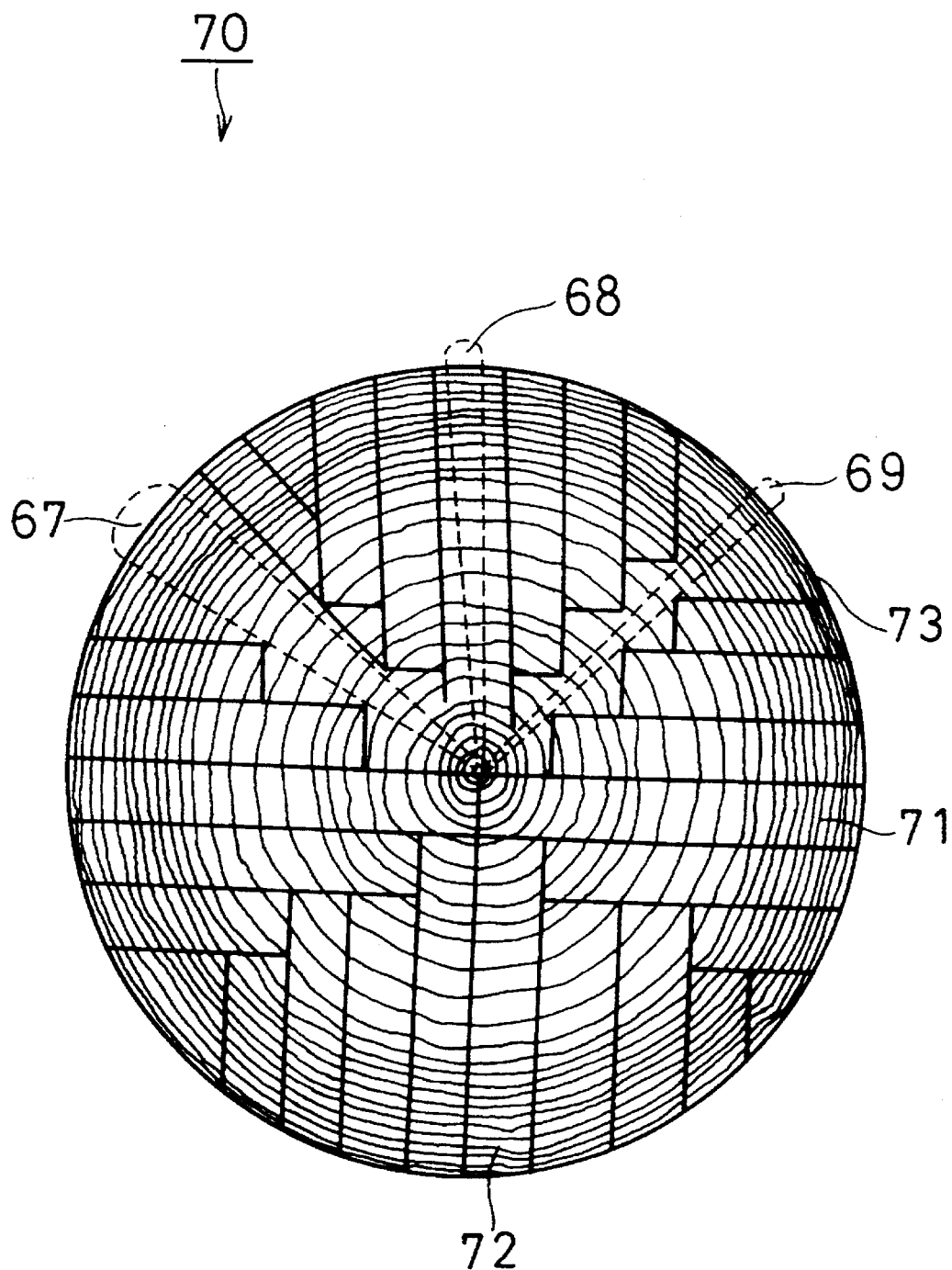
FIG. 12 is a drawing showing a method of lumbering straight grain boards in the conventional Japanese style.

On the other hand, according to the conventional Japanese method (B1), there were 14,000 m$^3$ (70% by weight when the weight of the raw logs are set as 100) of lumber (boards 71, 72 in FIG. 12) and 3,000 m$^3$ of lumber without knots on three or four sides (15% by weight as mentioned above). In other words, the raw logs could yield products without knots on three or four sides only at the low rate of 15% by weight, and 85% by weight became lower-class lumber with knots on two sides.

Furthermore, according to the conventional European/American method (C1), there were 17,000 m$^3$ (85% by weight when the weight of the raw logs are set as 100) of lumber (board 3 in FIG. 1) and 3,477 m$^3$ of lumber without knots on three or four sides (19% by weight as mentioned above). In other words, the raw logs could yield products without knots on three or four sides only at the low rate of 19% by weight, and 81% by weight became lower-class lumber with knots on two sides.

Another comparative experiment was conducted by using natural trees from a different mountain. The natural growing trees used in this experiment were Port-orford-cedar which were imported from a forest in Curry County, Oregon, USA (United State Forest Service). Raw logs were provided which consisted of 256 m$^3$ of logs without knots on all sides which are called plain (8% by weight), 1,056 m$^3$ of logs with knots on one side (33% by weight), and 1,888 m$^3$ of logs with knots on two sides and more (59% by weight). The total amount was 3,200 m$^3$ with 901 pieces of logs. The amount and the grading proportion were the same in all cases of A1, B1, and C1.

In the method of the present invention (A2), there were 2,720 m$^3$ (85% by weight when the weight of the raw logs are set as 100) of lumber (board 3 in FIG. 1) and 2,319 m$^3$ of lumber without knots on three and four sides (72% by weight as mentioned above). In other words, the raw logs could yield products at the rate of 72% by weight. Finally, products without knots on three or four sides became decorative laminated boards for buildings with a dimension of mainly 3 m in length, 12 cm or more in width, and 2.5 cm or more in thickness.

On the other hand, according to the conventional Japanese method (B2), there were 2,240 m$^3$ (70% by weight when the weight of the raw logs are set as 100) of lumber (boards 71, 72 in FIG. 12) and 477 m$^3$ of lumber without knots on three or four sides (15% by weight as mentioned above). In other words, the raw logs could yield products without knots on three or four sides only at the low rate of 15% by weight, and 85% by weight became lower-class lumber with knots on two sides.

Furthermore, according to the conventional European/American method (C2), there were 2,720 m$^3$ (85% by weight when the weight of the raw logs are set as 100) of lumber (board 3 in FIG. 1) and 594 m$^3$ of lumber without knots on three or four sides (19% by weight as mentioned above). In other words, the raw logs could yield products without knots on three or four sides only at the low rate of 19% by weight, and 81% by weight became lower-class lumber with knots on two sides.

As demonstrated by these comparative results, the method of this invention produces dramatically superior lumber yield.

Port-orford-cedar was used in the above-mentioned embodiments, but the present invention is not limited to the use of this wood. This invention can be widely applied for woods as follows: (A) Japanese Species: Itayakaede, Harigiri, Mizume, Udaikamba, Asada, Katsura, Hinoki, Sawara, Nezuko, Asunaro, Kuri, Buna, Konara, Tochinoki, Onigurumi, Kusunoki, Enju, Yachidamo, Shioji, Karamatsu, Akaezomatsu, Himekomatsu, Tsuga, Yamazakura, Shiurizakura, Kihada, Doronoki, Kouyamaki, Ichii, Sugi, Aoshina, Nire, Keyaki, Makaba, Sen, Kaya, Hiba, Momi, Nara, Matsu (B) USA Species: Alder, Ash, Aspen, Basswood, Beech, Yellow birch, Paper birch, Butternut, Cherry, Coffeetree, Cottonwood, Southern cypress, Red elm, Sap and red gum, Hackberry, Hickory, Honeylocust, Koa, Magnolia, Hard maple, Soft maple, Red oak, White oak, Pecan, Persimmon, Southern yellow pine, White pine, Sassafras, Sycamore, American tulipwood, Tupelo and black gum, Black walnut, Black willow (C) Tropical Asian Species: Pink satinwood, Terentang, New Guinea walnut, Amugis, Asam, Rengas, Spondias, Mempisang, Pulai, Jelutong, Agathis, Klinki pine, Durian, Canarium, Santiria, Perupok, Brown terminalia, Terminalia yellow, Taukkyan, Schizomeria, Binuang, Dillenia, Mersawa, Keruing, Kapur, Gagil, White lauan, Red lauan, Almon, Tangile, Mayapis, Red meranti, White seraya, Yellow meranti, White meranti, Selangan batu, Selangan batu merah, Resak, Quandong, Sloanea, New Guinea basswood, Pimelodendron, Mempening, Malas, Bakata, Ramin, Bintangor, Geronggang, Garcinia, Kayea, Beilschmiedia, Cryptocarya, Keranji, Kwila, Kingiodendron, Kempas, Pericopsis, Sepetir paya, Narra, Sepetir, Champaka, Jonkong, Amoora, Ranggu, Chisocheton, Dysox, Kalantas, Antiaris, Artocarpus, Fig, Parartocarpus, Penarahan, Kamerere, Water gum, Punah, Merkus pine, Podocarpus, New Guinea boxwood, Keruntum, Merbatu, Labula, Garo garo, Yellow hardwood, Evodia, Scaly ash, Taun, Chrysophyllum, Nyatoh, Planchonella white, White siris, Duabanga, Amberoi, Bayor, Scaphium, Mengkulang, Schima, Aquilaria, Pentace, Ebony, Sonokelibg, Celtis, Gmelina, Virex, Ma-klua, Kilet, Rosewood, Ching-chan, Teak, Swintonia, Ilex, Sapium, Belian, Sengon laut, Memgaris, Talauma, Aglaia, Northern silky oak, Burckella, Sterculia, Lignum-vitae (D) North American Species: Port-orford-cedar, Alaska-cedar, Western redcedar, Pacific silver fir, Grand fir, Noble fir, Western latch, Western white pine, Lodgepole pine, Ponderosa pine, Engelmann spruce, Sitka spruce, Douglas fir, Western hemlock, Redwood (E) Russian Species: Pikhta, Listuennitsa, Elka, Kedr, Sosna, Bereza, Dub, Orekh, Iasenj, Barkhat, Topolj, Osina, Lipa, Ilem (F) African Species: Esia, Ovangkol, Bubinga, Zebrano, Wenge, Afrormosia, African padouk, Pao rosa, Tiama, Sapelli, Utile, African mahogany, Iroko, Moabi, Longui, Makore, Mansonia, Yellow sterculia, Obeche (G) Tropical American Species and Others: Radiata pine, Taiwan hinoki, Paulownia, Hububalli, Shibidan, Balsa, Tatabu, Wallaba, Courbaril, Purpleheart, Wamara, Mahogany, China tamo, Alerce, Araucaria, Manio, Cipress, Laurel, Roble The above listed trees are for illustrative purposes, and the invention can be applied to all kinds of wood in the world and can contribute greatly to more effective utilization of natural resources on earth.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A method of manufacturing laminated lumber, comprising the steps of:

(A) providing a log of a natural tree;

(B) cutting along first cutting lines drawn from the outside of the log of a natural tree into a vicinity of the core of the log in a direction perpendicular to a large knot in the log, and subsequently, cutting along second cutting lines drawn in a direction perpendicular to said first cutting lines on an outside part of the log, and then, cutting along third cutting lines drawn from the outside into the vicinity of the core in a direction perpendicular to said second cutting lines to produce a plurality of boards from said log;

(C) cutting said boards in a thickness direction into pieces of prismatic wood, wherein at least one cutting line is cut to avoid knot parts;

(D) arranging said pieces of prismatic wood in a transverse direction, wherein inside pieces of prismatic wood composing said laminated lumber are arranged such that inside knots are present in a transverse direction and so that knots are not present at least on the surface of said laminated lumber; and (E) applying an adhesive between said pieces of prismatic wood and bonding them together by pressurization to produce laminated lumber and thereafter smoothing the surface of said laminated lumber.

2. A method of manufacturing laminated lumber as claimed in claim 1, wherein knots are not present on three or four sides which face a crossing direction to a longitudinal direction of said laminated lumber.

3. A method of manufacturing laminated lumber as claimed in claim 1, wherein grains are arranged substantially in a longitudinal direction of said laminated lumber.

4. A method of manufacturing laminated lumber as claimed in claim 1, wherein said plurality of prismatic wood consists of at least three pieces of wood.

5. A method of manufacturing laminated lumber as claimed in claim 1, wherein said laminated lumber has a length of 300 mm or more, a width of 30 mm or more, and a thickness of 10 mm or more.

6. A method of manufacturing laminated lumber as claimed in claim 1, wherein said laminated lumber is at least one wood selected from the group consisting of Teak, Oak, Hinoki, Port-orford-cedar, Sugi, Itayakaede, Harigiri, Mizume, Udaikamba, Asada, Katsura, Sawara, Nezuko, Asunaro, Kuri, Buna, Konara, Tochinoki, Onigurumi, Kusunoki, Enju, Yachidamo(=Iasenj), Shioji, Karamatsu, Akaezomatsu, Himekomatsu, Tsuga, Yamazakura, Shiurizakura, Kihada(=Barkhat), Doronoki(=Topolj), Kouyamaki, Ichii, Aoshina, Nire(=Ilem), Keyaki, Makaba, Sen, Kaya, Hiba, Momi, Nara(=Dub), Matsu, Alder, Ash, Aspen, Basswood, Beech, Yellow birch, Paper birch, Butternut, Cherry, Coffeetree, Cottonwood, Southern cypress, Red elm, Sap and red gum, Hackberry, Hickory, Honeylocust, Koa, Magnolia, Hard maple, Soft maple, Red oak, White oak, Pecan, Persimmon, Southern yellow pine, White pine, Sassafras, Sycamore, American tulipwood, Tupelo and black gum, Black walnut, Black willow, New Guinea walnut, Jelutong, Agathis, Mersawa, Koruing, Kapur, White lauan, Red lauan, Red meranti, White seraya, Yellow meranti, White meranti, Selangan batu, Selangan batu merah, Ramin, Narra, Sepetir, Ebony, Sonokelibg, Rosewood, Teak, Lignum-Vitae, Alaska-cedar, Western redcedar, Pacific silver fir, Grand fir, Noble fir, Western larch, Western white pine, Lodgepole pine, Ponderosa pine, Engelmann spruce, Sitka spruce, Douglas fir, Western hemlock, Redwood, Pikhta, Elka, Kedr, Sosna, Bereza, Dub(=Nara), Orekh, Iasenj(=Yachidamo), Bubinga, Sapelli, African mahogany, Moabi, Makore, Radiata pine, Taiwan hinoki, Paulownia, Balsa, Mahogany, China tamo, Alerce, Araucaria, Manio, Cipress, Laurel, and Roble.

7. A method of manufacturing laminated lumber as claimed in claim 1, wherein said first and second cutting lines are drawn avoiding knot parts in step (B).

8. A method of manufacturing laminated lumber as claimed in claim 1, wherein outside pieces of prismatic wood are selected to have substantially no knots on the surface for the arrangement in step (C).

* * * * *